United States Patent [19]

Allen et al.

[11] Patent Number: 4,956,141
[45] Date of Patent: Sep. 11, 1990

[54] MOLDING PROCESS UTILIZING A MOLD RELEASE MEMBRANE

[75] Inventors: Thomas E. Allen; James E. Matzinger; William R. Weaver, all of Toledo, Ohio

[73] Assignee: Libbey-Owens-Ford Co., Toledo, Ohio

[21] Appl. No.: 335,183

[22] Filed: Apr. 7, 1989

[51] Int. Cl.$^5$ ............... B29C 33/62; B29C 45/00
[52] U.S. Cl. ................ 264/297.2; 264/316; 264/328.6; 264/334; 264/338
[58] Field of Search ........... 264/334, 336, 338, 297.2, 264/316, 328.6; 249/112, 115; 425/89, 436 R, 436 RM

[56] References Cited

U.S. PATENT DOCUMENTS 3,576,930 12/1967 Watters et al. ............... 264/46.4
4,031,176 6/1977 Molbert ....................... 264/316 X

FOREIGN PATENT DOCUMENTS 2263584 9/1973 Fed. Rep. of Germany ...... 249/112
140220 2/1980 Fed. Rep. of Germany ...... 264/316

Primary Examiner—Jeffery Thurlow
Assistant Examiner—Leo B. Tentoni
Attorney, Agent, or Firm—Marshall & Melhorn

[57] ABSTRACT

Molded plastic articles are prepared by disposing a mold release membrane across a mold section, closing the mold, injecting polymeric precursor materials behind the membrane causing it to conform and adhere to the mold cavity surface, and thereafter parting the mold sections and parting the molded plastic article away from the release membrane which remains adhered to the mold cavity surface. Subsequent injections may be used to prepare additional molded plastic articles, thereby reusing the release membrane which at all times remains adhered to the mold cavity surface.

17 Claims, 3 Drawing Sheets

MOLDING PROCESS UTILIZING A MOLD RELEASE MEMBRANE

FIELD OF THE INVENTION

The present invention relates generally to release agents for molded plastic articles, and more particularly, to a release membrane, which is conformed and adhered to a mold cavity wall upon the injection of polymeric material from which a molded plastic article is made. The mold release film is thereafter retained by the mold cavity wall, upon parting of the mold sections, to act as a release agent for subsequent injections of polymeric material.

BACKGROUND OF THE INVENTION

Methods for the production of molded plastic articles, which are useful for example for the manufacture of automotive body panels, are well known in the art. Typically, such molded plastic automotive components may be manufactured by reactive molding processes, such as for example "reaction injection molding" (RIM) in which a polyisocyanate, a polyol and a chain extender are brought together in a single operation (the polyol and chain extender may be preblended if desired) and immediately injected into a mold cavity. Other polymeric materials, such as for example polyesters, epoxies, and polyamides, may likewise be utilized in RIM-type reactive molding processes, and other molding processes, such as for example bulk molding, may be used to form the molded plastic articles. The highly reactive liquid starting materials (polymeric precursors) are injected into the mold, after having been mixed in what is commonly known as a "positively controlled mixing head".

Reaction injection molded polyurethanes are disclosed in British Pat. No. 1,534,258 and German Auslegeschrift Pat. No. 1,196,864. U S. Pat. No. 3,655,597 discloses reacting polyisocyanate, polyol, blowing agent, diamine and catalyst for the manufacture of molded polyurethane components. A detailed description of the RIM process may be found in Prepelka and Wharton "Reaction Injection Molding in the Automotive Industry," Journal of Cellular Plastics, vol. II, Nov. 2, 1975. The RIM process also has been advantageously employed in the so called "encapsulated automotive glazing" manufacturing process, wherein a polyurethane gasket is formed around the perimeter of a glazing unit of transparent material such as glass. See U.S. Pat. No. 4,561,625. Polyester resins and epoxy resins useful for reactive molding processes are disclosed in U.S. Pat. Nos. 4,405,538 and 4,581,339, respectively. Reactive molding processes employing polyamides are generally disclosed in the "Kirk-Othmer Concise Encyclopedia of Chemical Technology", John Wiley & Sons, New York, pp. 915–920 (1985).

The reactive molding process may suitably employ any flowable polymeric precursor materials which may be injected into a mold cavity where the polymeric materials react in situ to prepare the desired plastic article. Polyurethane precursors are typically used for the production of rigid automotive components such as bumpers, and for the production of flexible body parts generally known in the automotive industry as "soft face elements".

As is commonly known, molded plastic articles may be easily removed from mold cavities through the use of release agents, such as for example soaps, waxes, silicones, and polytetrafluoroethylene. Conventional release agents generally comprise a release film or coating which is sprayed into the mold cavity prior to the molding operation, or a film which is applied before the injection process and which thereafter remains adhered to the molded plastic article. Cycle times are increased due to the necessity of reapplying the release agent after each molding cycle, or at least periodically. Also known in the art are internal release agents which are injected along with the polymeric materials into the mold cavity.

Release agents sprayed into a mold cavity typically result in a residue on either or both surfaces of the molded plastic article and the mold cavity wall. Such release agents have the disadvantage that they must be removed completely from the surfaces of the molded plastic article after its removal from the mold, since otherwise it is not possible for paint or other surface treatments to properly adhere. The additional operation of removing residual release agent from the surfaces of the molded plastic article requires additional processing costs. In cases where the release agent is not water soluble, the surfaces of the molded plastic article must be degreased or treated with solvents which detrimentally alter the finish of the molded plastic article. Another disadvantage with spray-applied release agents is that residual amounts remain in the mold cavity and tend to grow in thickness with continuous production, thereby requiring removal from time to time. The use of solvents for removing release agents from the mold cavity after each injection also lengthens cycle times, because the solvent must be allowed to evaporate after its application. U.S Pat. Nos. 4,312,672 and 3,856,908 disclose release agents for polyurethane molding operations which are sprayed or brushed into the mold cavity.

U.S. Pat. No. 4,220,727 discloses a method of producing polyurethane molded plastic articles, utilizing an internal mold release additive which is contained in the polymeric precursors when injected into the mold cavity.

U.S. Pat. No. 3,331,904 discloses a parting membrane which is placed between the mold halves and conformed to the mold cavity wall upon injection of a polymeric material. The parting membrane adheres to the molded plastic article as a coating, and is withdrawn, along with the molded plastic article, when the mold halves are parted.

U.S. Pat. No. 3,887,579 discloses a polyethylene terephthalate film which is coated on one surface with a release agent, and thereafter placed into a mold cavity with the surface having the release agent thereon exposed to the subsequently injected polymeric material. The polyethylene terephthalate film may be reused a number of times for consecutive injection molding cycles, but the surface of the film which contacts the polymeric material must be recoated with the release agent each time the mold halves are parted and the molded plastic article is ejected.

Finally, U.S. Pat. No. 3,844,523 discloses a multilayer planar release sheet which is inserted as a rigid structure into the mold cavity prior to the injection of a polymeric material which generates gas upon curing. The release sheet allows the passage of the generated gas therethrough, thereby maximizing the expansion and degassing of the curing polymeric material. Although the release sheet is reusable, it is a planar rigid structure which is designed so as not to "sag" into or conform to the mold cavity, and additionally is not retained in the mold cavity upon the parting of the mold halves.

It must be noted that the prior art referred to hereinabove has been collected and reviewed only in light of the present invention as a guide. It is not to be inferred that such diverse art would otherwise be assembled absent the motivation provided by the present invention.

SUMMARY OF THE INVENTION

Accordant with the present invention, there is provided a process and apparatus for the production of a molded plastic article utilizing a mold release membrane. The process comprises the steps of:
  (A) providing a mold, including two or more cooperating mold sections, having a cavity therein for forming the molded plastic article, wherein at least a portion of the mold cavity defines a mold cavity surface to which a first surface of the mold release membrane is to adhere;
  (B) disposing a mold release membrane across the mold cavity surface;
  (C) closing the mold;
  (D) injecting polymeric precursor materials into the mold cavity behind the membrane, wherein the polymeric precursor materials fill the mold cavity and simultaneously deform the mold release membrane to substantially conform to the mold cavity surface, the polymeric precursor materials reacting in situ adjacent a second surface of the mold release membrane opposite the first surface, to form the molded plastic article; and
  (E) parting the mold sections, wherein the molded plastic article parts away from the second surface of the mold release membrane, and the first surface of the mold release membrane remains adhered to the mold cavity surface.

Subsequent multiple cycles of injecting, curing and parting of the molds may be performed as long as the mold release membrane is retained on the portion of the surface of the mold cavity to which it was originally adhered and continues to function as a mold release agent for the injection molding process.

Alternatively, the surface of the mold release membrane which is to be adhered to the mold cavity wall may be pretreated, such as for example by the application of an adhesive or a primer, or a vacuum may be applied between the surface of the mold cavity and the first surface of the mold release membrane, to enhance its adherence to the mold cavity surface.

Moreover, the mold or primer release membrane may be employed in such a manner so as to conform to substantially the entire surface defined by the mold cavity when the polymeric precursor materials are injected.

The mold release membrane, while rigid enough to be drawn over a mold section, is generally sufficiently flexible and stretchable to be deformed to the configuration of the mold cavity by the injecting of the polymeric precursors therebehind. However, it is contemplated that heated air for example may be admitted into the mold cavity prior to injection of the polymeric precursors, to condition the mold release membrane and thereby assist its conformation to the configuration of the mold cavity. Alternatively, vacuum means may be provided for assistance in drawing the mold release membrane into conformity with the surface of the mold cavity during injection of the polymeric precursors.

These "assists" eliminate the possibility of the mold release membrane wrinkling, if a tendency toward same exists. Moreover, the mold itself may be heated to an elevated temperature to aid the conditioning of the mold release membrane.

The molded plastic articles manufactured utilizing a mold release membrane according to the present invention are particularly useful for automotive body components and electrical and appliance housings.

BRIEF DESCRIPTION OF THE DRAWINGS

The novel features, which are characteristic of the present invention, are set forth with particularity in the appended claims. The invention itself, however, both as to structure and method of use, will best be understood from the accompanying description of specific embodiments, when read in connection with the drawings, in which:

DETAILED DESCRIPTION OF THE PREFERRED EMBODIMENT

Figure 1:
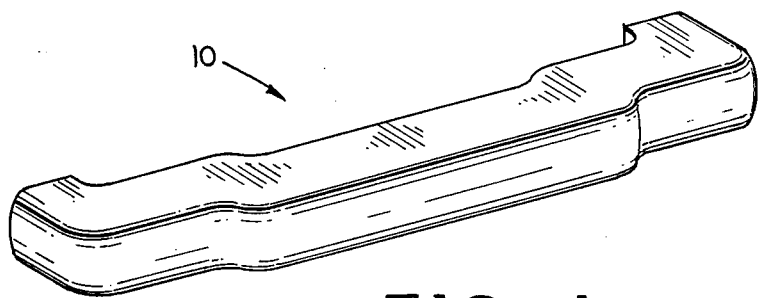
FIG. 1 is a perspective view of a molded plastic article manufactured by the process of the present invention.

Referring now to the Drawings, and particularly FIG. 1, there is shown generally at 10, example of a molded plastic article manufactured by the process of the present invention, and suitable for installation on an automotive vehicle as a bumper. It will be readily appreciated that the molded plastic articles prepared by the process of the present invention may likewise be of a shape suitable for installation as an automotive body panel, a flexible automotive component generally known in the art as a soft face element, an electrical or appliance housing, as well as for various other types of molded plastic articles.

Figure 2:
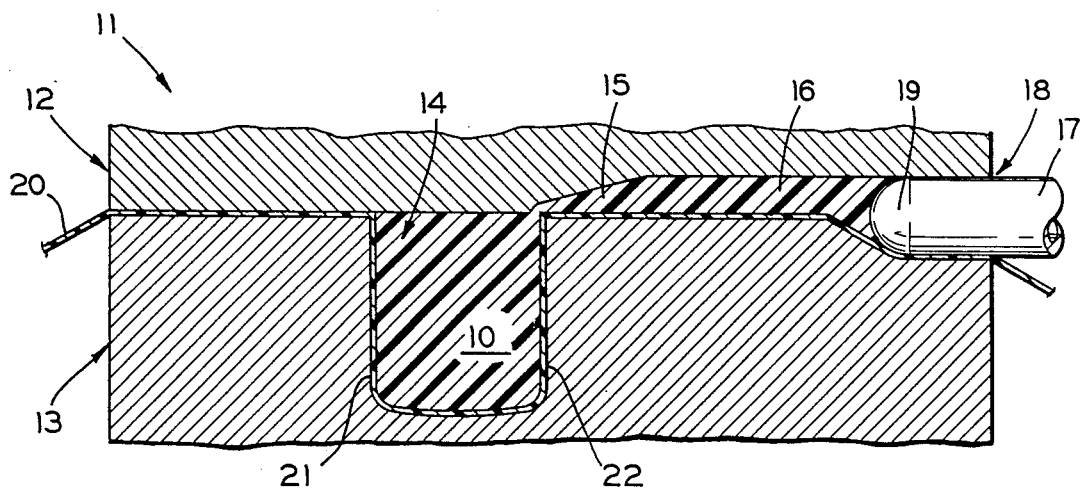
FIG. 2 is a sectional view of a closed mold structure, illustrating the position of the mold release membrane within the mold cavity after injecting the polymeric precursor materials and during the curing of the molded plastic article.

More specifically, the molded plastic article 10 is generally prepared by a reactive molding process, utilizing a mold release membrane in at least a portion of the mold cavity. As illustrated in FIG. 2, a typical mold, indicated generally at 11, comprises cooperating mold sections 12 and 13, including means for suitably opening and closing the mold sections (not shown). The mold sections 12 and 13 together define a mold cavity 14 for receiving the reactive molding polymeric precursor materials.

The mold cavity 14 communicates with an inlet means or gate 15 and associated mixing chamber 16 for receiving the polymeric precursor materials as from a positively controlled mixing head 17. Corresponding depressions within the mold sections 12 and 13 define a port 18 for receiving the positively controlled mixing head tip 19, allowing it to communicate with the mixing chamber 16 when the mold 11 is closed. The polymeric precursor materials are adapted to polymerize or cure in situ within the mold cavity 14 to form the molded plastic article 10.

The process of the present invention may conveniently be practiced by disposing a web 20 of the mold release membrane 21 over one of the mold sections (illustrated in FIG. 2 as having been disposed over mold section 13). After closing the mold 11, the polymeric precursor materials are injected behind the mold release membrane 21 to depress the membrane 21 into conformity with and to fill the mold cavity 14. By the term "behind the mold release membrane", as it is used herein, is meant that the polymeric precursor materials are injected adjacent the surface of the membrane 21 which is opposite the surface that is intended to adhere to the mold cavity surface. The pressure of injection, as well as the autogenous pressure generated by the curing of the polymeric precursor materials, causes the mold release membrane 21 to adhere to the portion 22 of the mold cavity 14 from which the molded plastic article 10 desirably is to be easily parted.

In some cases, it is beneficial to treat the mold release membrane 21 prior to its use in the process of the present invention, to enhance the adhesion thereof to the portion 22 of the mold cavity 14. Specifically, the first surface of the mold release membrane 21 which is to be adhered to the portion 22 of the mold cavity 14 may be treated, such as for example by the application of a pressure sensitive adhesive or a primer such as is disclosed for example in U.S. Pat. No. 4,367,313 which is incorporated herein in its entirety by reference thereto. Alternatively, a primer or adhesive may be applied directly into the mold cavity 14 prior to the disposition thereover of the mold release membrane 21. Moreover, a vacuum may be applied between the first surface of the mold release membrane 21 and the portion 22 of the surface of the mold cavity 14, with or without the use of an adhesive or primer, to enhance the adhesion therebetween. Finally, the mold release membrane 21 may comprise a laminate of two films; one of which easily bonds to the surface of the mold cavity 14, and the other which contacts and acts as a mold release for the molded plastic article 10.

In yet another embodiment of the present invention, the portion 22 of the surface of the mold cavity 14 is rough, and thereby provides for a mechanical bond with the mold release membrane 21 pressed thereagainst by the pressure of injection and the autogenous pressure generated by the curing of the polymeric precursor materials. Typically, such a bond is augmented by the use of an adhesive or primer between the membrane 21 and the rough surface of the mold cavity 14. In such an embodiment, a smooth surface may still be produced on the molded plastic article 10, defined by the smooth adjacent surface of the mold release membrane 21, even though the surface of the mold cavity 14 is rough.

Suitable mold release membranes may be prepared from materials which include, but are not limited to polytetrafluoroethylene, high molecular weight polyethylene, polyvinyl chloride, polyvinyl fluoride, and the like, as well as laminae thereof. The thicknesses of the mold release membranes are conveniently in the range from about 0.5 to about 15 mils, and the materials are generally known in the polymeric film art, as well as commercially available. Preferred mold release membranes are prepared from polytetrafluoroethylene or high molecular weight polyethylene.

Suitable polymeric precursors for manufacturing the molded plastic articles of the present invention include polyurethane precursors typically used for the reaction injection molding (RIM) process. These include isocyanates, such as for example methylene-di-p-henylene isocyanate and toluene diisocyanates, and polyols which preferably are either polyether polyols or polyester polyols. Generally, the polyurethane precursors include various chain extenders and curing agents such as for example diamine compounds either alone or in various blends. The polyurethane precursors typically comprise a two part composition that is mixed just prior to or upon injection into a mold cavity, so that all or substantially all of the reaction occurs within the mold cavity after injection. One component comprises the isocyanate, and the other component comprises the polyol, chain extender, and curing catalyst, and optional additives.

Additionally, suitable polymeric precursors include those used to prepare polyamides. These include monoaminomonocarboxylic acids, or internal lactams thereof, as well as substantially equimolar mixtures of diamines and dicarboxylic acids. Examples of a convenient monoaminomono-carboxylic acid and lactam are epsilon-aminocaproic acid and caprolactam. Suitable diamines include hexamethylenediamine and tetramethylenediamine. Useful dicarboxylic acids include adipic acid and glutaric acid. Processes for preparing polyamides utilizing these as well as other precursors are thoroughly disclosed in "Polyurethanes Chemistry and Technology", Robert E. Krieger Publishing Company, Inc., Malabar, FL (1983).

Other suitable polymeric precursor materials include, but are not limited to, crosslinkable polyester and epoxy resins, which are typically employed in reactive molding processes. The polyester resins generally comprise unsaturated polyesters dissolved in a polymerizable ethylenically unsaturated monomer such as for example styrene, and a crosslinking initiator. Useful epoxy resins generally comprise ethers containing the epoxide group and aliphatic polyols, which together cure readily in the presence of amine catalysts. Processes for preparing crosslinkable polyester and epoxy resins are more fully set forth in E.E. Schildknecht, "Polymer Process", vol. X, Interscience Publishers (1956).

The polymeric precursor materials may additionally contain conventional adjuvants, such as for example blowing agents, fillers, thermal stabilizers, dyes, flame retardants, pigments, plasticizers, antistatic agents, ultraviolet ray absorbers, lubricants, and the like. Preferred polymeric precursors are those used to prepare polyurethanes.

Figure 3:
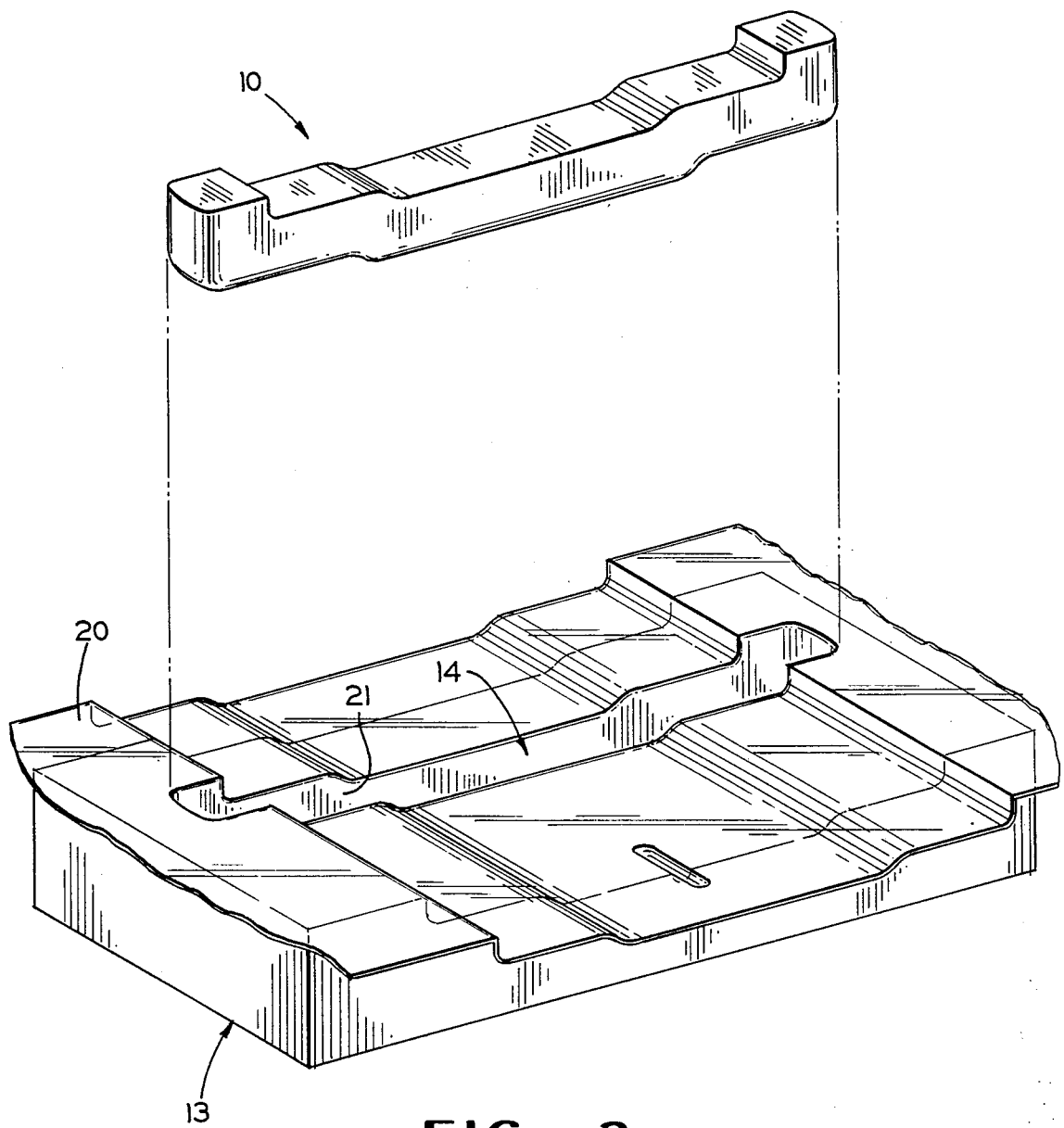
FIG. 3 is a perspective view, illustrating the separated molded plastic article, mold release membrane web, and mold section having the mold release membrane adhered thereto.

FIG. 3 illustrates the molded plastic article 10, in relation to the web 20 of the mold release membrane 21 and the mold section 13, following the parting of the mold and the ejection of the molded plastic article 10 from the mold section 13. The mold release membrane 21 is adhered to the mold cavity 14, and may thereafter be used as a mold release for subsequent cycles of injecting, curing, parting, and ejecting of molded plastic articles.

Briefly reviewing the process of the present invention, a web 20 of a mold release membrane 21 is disposed over the surface of a mold section. The mold 11 is closed, thereby causing the web 20 to extend generally planarly across the mold cavity 14. The mold release membrane 21 is generally sufficiently stretchable so that, upon introduction of the polymeric precursors through the mixing chamber 16 and gate 15 along the upper surface of (behind) the web 20, the mold release membrane 21 will be stretched and depressed into conformity with the portion 22 of the surface of the mold cavity 14. As the polymeric precursors cure, the autogenous pressure generated further assists the urging of the mold release membrane 21 against the portion 22 of the surface of the mold cavity 14. After the molded plastic article 20 has cured sufficiently to retain its shape and be easily handled, the mold sections 12 and 13 are parted, and the molded plastic article 10 is parted away from the mold release membrane 21 which remains adhered to the portion 22 of the mold cavity 14 and to the mold section 13.

For several mold release membranes, the web 20 will readily conform to the portion 22 of the surface of the mold cavity 14 upon injection of the polymeric precursor materials. In those instances where it may be desirable to deform the mold release membrane prior to the introduction of the polymeric precursor materials, or to provide assistance in conforming the mold release membrane 21 to the portion 22 of the surface of the mold cavity 14, the alternative embodiments of FIGS. 4 and 5 may be utilized.

Figure 4:
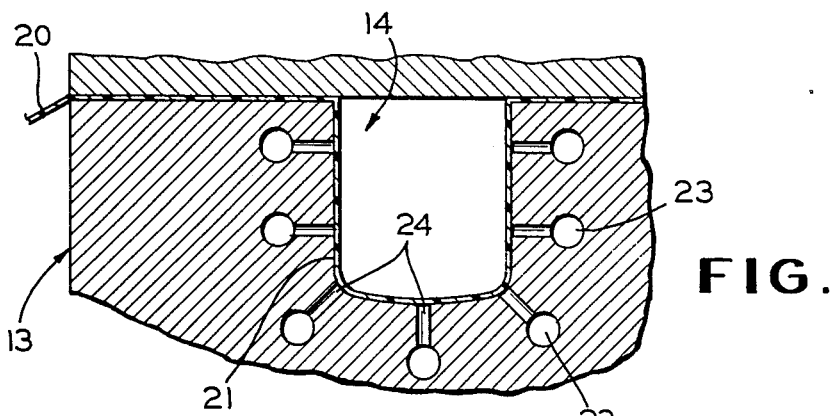
FIG. 4 is an enlarged, fragmentary, sectional view of an alternate embodiment of the process, incorporating a vacuum assist.

Thus, in the embodiment of FIG. 4, the mold section 13 is provided with conduits 23 selectively coupled to a vacuum source (not shown). The conduits 25 in turn are in communication with a series of perforations 24 spaced along and opening into the portion 22 of the surface of the mold cavity 14. With the mold 11 closed, and the web 20 in place, application of a vacuum to the conduits 23 will draw the membrane 21 against the portion 22 of the surface of the mold cavity 14, prior to or in conjunction with the injection of the polymeric precursor materials.

Figure 5:
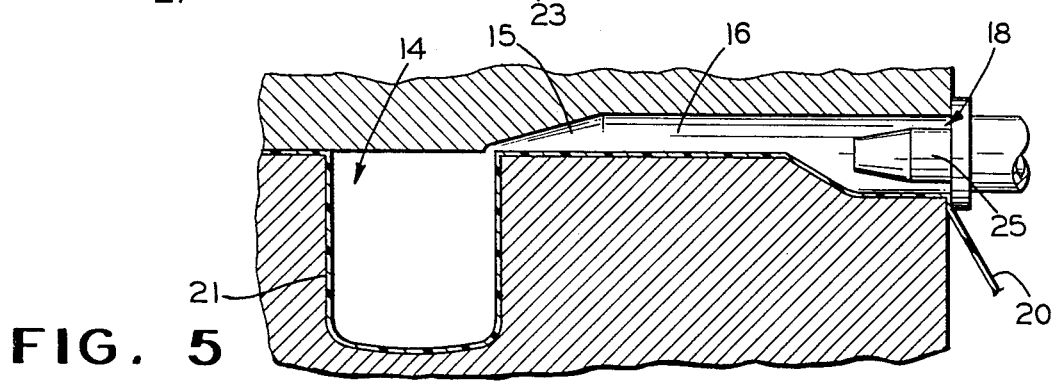
FIG. 5 is an enlarged, fragmentary, sectional view of an alternate embodiment of the process, illustrating an arrangement for hot air conditioning of the mold release membrane prior to injection of the polymeric precursors.

In the embodiment of FIG. 5, a tubular outlet 25 of a conventional air heater (not shown) is directed into the port 18, prior to insertion of the positively controlled mixing head tip 19. Suitable heated air is forced under pressure into the mold cavity 14, above the web 20 of mold release membrane 21. The mold release membrane 21 is thus preheated so as to be more readily deformable, and is additionally urged toward the portion 22 of the surface of the mold cavity 14. After a suitable period of time, the introduction of heated air into the mold cavity 14 is discontinued, and the polymeric precursor materials are injected into the mold cavity 14.

Figure 6:
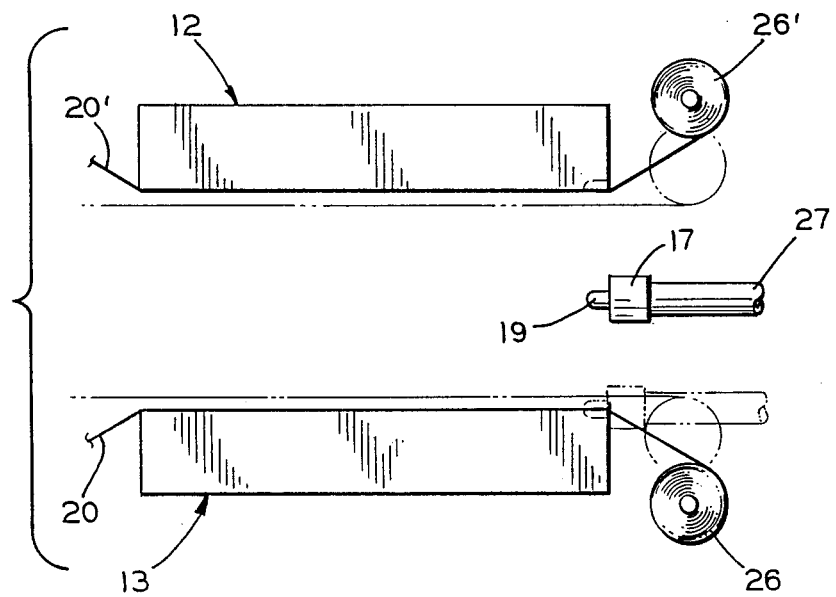
FIG. 6 is a side elevational view of an apparatus for locating the mold release membrane in both halves of a two section mold.

FIG. 6 shows an embodiment of the present invention, illustrating a method for employing a mold release membrane in both halves of a two section mold. Thus, there are illustrated web supply mechanisms (not entirely shown) having mold release membrane supply rolls 26' and 26, from which webs 20' and 20 are drawn across the mold sections 12 and 13, respectively. Also illustrated in FIG. 6 is a vertically movable positively controlled mixing head 17, having an injection tip 19, and connected to a control arm 27. The control arm 27 is adapted to move vertically by conventional mechanical means (not shown), from a position between the mold sections 12 and 13 as illustrated by solid lines in FIG. 6, to a position indicated by broken lines wherein the tip 19 is received into the port formed by corresponding depressions within the upper and lower mold sections 12 and 13, respectively, when the mold is closed.

In operation, the webs 20' and 20 are drawn over the mold sections 12 and 13, respectively, as shown by the broken lines in FIG. 6. Thereafter, the supply rolls 26' and 26, and the webs 20' and 20, are positioned so as to contact the webs 20' and 20 against the mold sections 12 and 13, respectively, as illustrated by solid lines in FIG. 6. The mold sections 12 and 13 are then brought together, and simultaneously, the positively controlled mixing head 17 is lowered to the position indicated by broken lines in FIG. 6, such that the tip 19 is enclosed by the port 18 formed as the corresponding depressions in the mold sections 12 and 13 are brought together. The closed mold 11 thereafter has two webs 20' and 20 of mold release membrane positioned generally planarly within the mold cavity 14. Additionally, the positively controlled mixing head tip 19 is positioned so as to inject the polymeric precursor materials into the mold chamber 14, between the webs 20' and 20 of mold release membrane. As the polymeric precursor materials are injected, and during the cure of the injected materials which generates autogenous pressure, the webs 20' and 20 are conformed and adhered to substantially the entire surface of the mold cavity 14.

Figure 7:
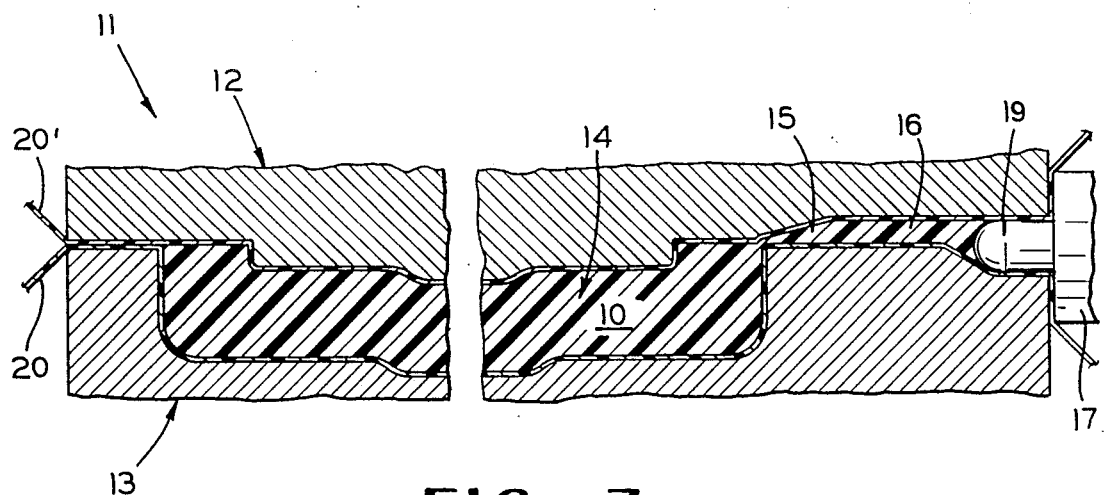
FIG. 7 is an enlarged, fragmentary, sectional view of a closed mold structure, illustrating the position of the mold release membrane within both halves of a two-section mold, after injecting the polymeric precursor materials and during the curing of the molded plastic article.

FIG. 7 illustrates the closed mold 11 structure of the embodiment of FIG. 6, showing mold sections 12 and 13, having therebetween two webs 20' and 20 of mold release membrane and the molded plastic article 10. Also shown is the positively controlled mixing head 17 and tip 19 positioned to allow the injection of the polymeric precursor materials into the mixing chamber 16, thence to the gate 15, and finally into the mold cavity 14.

With the mold release membrane of the present invention, it is possible in a technically simple, economical, and effective manner to remove molded plastic articles, especially molded polyurethane articles, from reactive injection molds. Moreover, once applied to the surface of the mold cavity, the mold release membrane remains in place adhered to the mold cavity wall, and provides a mold release surface against which to inject subsequent shots of polymeric precursor materials. Thus, the adhered mold release membrane is effective as a mold release for several cycles of injection, cure, and article removal. When the adhered mold release membrane deteriorates to the point where it is ineffective as a release agent, it is simply peeled out of the mold or removed with a solvent, to prepare the mold cavity for another application of a new layer of mold release membrane.

The mold release membrane adhered to the mold cavity may be used as a release agent, i.e., an agent which allows for the easy parting and removal of a molded plastic article from the mold cavity, until the mold release membrane ceases to function as a mold release agent. By this is meant, until the membrane no longer allows for the easy parting and removal of a molded plastic article from the mold cavity, as may be evidenced such as for example by surface defects on the finished molded article, difficulty in parting the molded plastic article away from the membrane, visually observed tears in the adhered membrane, and the like.

The use of a mold release membrane is especially important where a mold cavity includes polymeric seals or gaskets for defining the configuration of the injection cavity, such as is disclosed for example in U.S. Pat. No. 4,561,625 which is incorporated herein in its entirety by reference thereto.

While certain representative embodiments and details have been shown for the purpose of illustrating the present invention, it will be apparent to those ordinarily skilled in the art that various changes in applications can be made herein, and that the invention may be practiced otherwise than as specifically illustrated and described without departing from its spirit and scope. For example, molds having more than two mold sections may be employed using a mold release membrane for each section, or the mold release membrane may be disposed over a mold section as a single sheet instead of a continuous web drawn from a supply roll.

What is claimed is:

1. A process for preparing a molded plastic article utilizing a mold release membrane, comprising the steps of:
   (A) providing a mold, including at least two cooperating mold sections, having a cavity therein for forming the molded plastic article, wherein at least a portion of the mold cavity defines a mold cavity surface to which a first surface of the mold release membrane is to adhere;
   (B) disposing a mold release membrane across the mold cavity surface;
   (C) closing the mold;
   (D) injecting polymeric precursor materials into the mold cavity behind the membrane, wherein the polymeric precursor materials fill the mold cavity and simultaneously deform the mold release membrane to substantially conform to the mold cavity surface, the polymeric precursor materials reacting in situ adjacent a second surface of the mold release membrane opposite the first surface, to form the molded plastic article; and
   (E) parting the mold sections, wherein the molded plastic article parts away from the second surface of the mold release membrane, and the first surface of the mold release membrane remains adhered to the mold cavity surface.

2. A process for preparing a molded plastic article utilizing a mold release membrane comprising the steps of:
   (A) providing a mold, including at least two cooperating mold sections, having a cavity therein for forming the molded plastic article, wherein at least a portion of the mold cavity defines a mold cavity surface to which a first surface of the mold release membrane is to adhere;
   (B) disposing a mold release membrane across the mold cavity surface;
   (C) closing the mold;
   (D) injecting polymeric precursor materials into the mold cavity behind the membrane, wherein the polymeric precursor materials fill the mold cavity and simultaneously deform the mold release membrane to substantially conform to the mold cavity surface, the polymeric precursor materials reacting in situ adjacent a second surface of the mold release membrane opposite the first surface, to form the molded plastic article;
   (E) parting the mold sections, wherein the molded plastic article parts away from the second surface of the mold release membrane, and the first surface of the mold release membrane remains adhered to the mold cavity surface;
   (F) removing the molded plastic article from the mold;
   (G) closing the mold;
   (H) injecting polymeric precursor materials into the mold cavity, wherein the polymeric precursor materials react in situ to form the molded plastic article;
   (I) parting the mold sections, wherein the molded plastic article parts away from the second surface of the mold release membrane, and the first surface of the mold release membrane remains adhered to the mold cavity surface;
   (J) removing the molded plastic article from the mold; and
   (K) repeating continually steps G, H, I, and J in sequential order, until the mold release membrane ceases to function as a mold release agent.

3. The process for preparing a molded plastic article utilizing a mold release membrane, according to claim 1 or 2, wherein the mold release membrane is adhered to substantially the entire surface of the mold cavity.

4. The process for preparing a molded plastic article utilizing a mold release membrane, according to claim 1 or 2, wherein the mold release membrane is disposed across the mold section by drawing a web of the mold release membrane from a supply roll across the mold section.

5. The process for preparing a molded plastic article utilizing a mold release membrane, according to claim 1 or 2, wherein the mold release membrane is disposed across the mold section by placing a sheet of the mold release membrane across the mold section.

6. The process for preparing a molded plastic article utilizing a mold release membrane, according to claim 1 or 2, wherein the mold release membrane is prepared from a material selected from the group consisting of high density polyethylene, polytetrafluoroethylene, polyvinyl chloride, polyvinyl fluoride, and laminae thereof.

7. The process for preparing a molded plastic article utilizing a mold release membrane, according to claim 1 or 2, wherein the mold release membrane is prepared from high density polyethylene.

8. The process for preparing a molded plastic article utilizing a mold release membrane, according to claim 6, wherein the mold release membrane has a thickness from about 0.5 to about 15 mils.

9. The process for preparing a molded plastic article utilizing a mold release membrane, according to claim 1 or 2, wherein the polymeric precursor materials are selected from the group consisting of precursors suitable for preparing polyurethanes, polyesters, polyamides, and epoxies.

10. The process for preparing a molded plastic article utilizing a mold release membrane, according to claim 1 or 2, wherein the polymeric precursor materials are those used to prepare polyurethanes.

11. The process for preparing a molded plastic article utilizing a mold release membrane, according to claim 1 or 2, wherein the first surface of the mold release membrane is treated to enhance the adhesion of the mold release membrane to the mold cavity surface.

12. The process for preparing a molded plastic article utilizing a mold release membrane, according to claim 11, wherein the treatment comprises the application of a material selected from the group consisting of pressure sensitive adhesives and primers.

13. The process for preparing a molded plastic article utilizing a mold release membrane, according to claim 1 or 2, wherein prior to step B, a material selected from the group consisting of pressure sensitive adhesives and primers is applied to the mold cavity surface.

14. The process for preparing a molded plastic article utilizing a mold release membrane, according to claim 1 or 2, wherein the mold cavity surface, to which the first surface of the mold release membrane is adhered, is rough, thereby enhancing the adhesion of the mold release membrane to the mold cavity surface, the second surface of the mold release membrane imparting a smooth finish to the molded plastic article.

15. The process for preparing a molded plastic article utilizing a mold release membrane according to claim 1 or 2, wherein prior to step C, a vacuum is applied to the mold cavity, so as to assist conformation of the mold release membrane to the mold cavity surface.

16. The process for preparing a molded plastic article utilizing a mold release membrane, according to claim 1 or 2, wherein simultaneously with step C, a vacuum is applied to the mold cavity, so as to assist conformation of the mold release membrane to the mold cavity surface.

17. The process for preparing a molded plastic article utilizing a mold release membrane, according to claim 1 or 2, wherein prior to step C, heated air is introduced to the mold cavity, so as to assist conformation of the mold release membrane to the mold cavity surface.

* * * * *